United States Patent [19]
Indlekofer

[11] Patent Number: 5,866,995
[45] Date of Patent: Feb. 2, 1999

[54] AUXILIARY SYSTEM FOR A MOTOR VEHICLE

[75] Inventor: Norbert Indlekofer, Bühl, Germany

[73] Assignee: LuK Fahrzeug-Hydraulik GmbH & Co. KG, Bad Homburg, Germany

[21] Appl. No.: 908,631

[22] Filed: Aug. 7, 1997

Related U.S. Application Data

[63] Continuation-in-part of Ser. No. 436,949, May 8, 1995, abandoned.

[30] Foreign Application Priority Data

May 9, 1994 [DE] Germany .......................... 44 16 390.8
Apr. 22, 1995 [DE] Germany ........................ 195 14 929.7

[51] Int. Cl.⁶ ..................................................... H02K 7/14
[52] U.S. Cl. .................................. 318/4; 318/280; 318/9; 318/10; 318/14; 123/41 R; 180/53.1
[58] Field of Search .................................. 318/280, 9, 10, 318/14, 4; 312/34.12; 192/50; 123/41 R, 41, 179.1; 180/53.1

[56] References Cited

U.S. PATENT DOCUMENTS

| | | | |
|---|---|---|---|
| 3,868,835 | 3/1975 | Reeve | 123/41 R |
| 4,248,012 | 2/1981 | Kirby et al. | 123/41 R |
| 4,587,697 | 5/1986 | Link et al. | 318/9 |
| 4,930,455 | 6/1990 | Creed et al. | 123/41 R |
| 5,333,517 | 8/1994 | Bryson et al. | 192/50 |
| 5,335,746 | 8/1994 | Betz | 180/248 X |
| 5,374,035 | 12/1994 | Santos | 180/53.1 |
| 5,375,920 | 12/1994 | Cassia | 312/34.12 |
| 5,438,733 | 8/1995 | Melcher et al. | 180/248 X |
| 5,588,327 | 12/1996 | Downs et al. | 192/87.13 X |

*Primary Examiner*—Karen Masih
*Attorney, Agent, or Firm*—Anderson, Kill & Olick, P.C.

[57] ABSTRACT

An auxiliary system for a motor vehicle including at least two intermittently driven auxiliary devices, a single electric motor for driving the at least two auxiliary devices, a free wheel arrangement for operatively connecting the at least two auxiliary devices with the electric motor in such a way that one of the at least two auxiliary devices is, from time to time, not operatively connected with the electric motor, and a priority circuit for determining the priority order of actuation of the at least two auxiliary devices, when both devices need be actuated.

16 Claims, 5 Drawing Sheets

AUXILIARY SYSTEM FOR A MOTOR VEHICLE

RELATED APPLICATIONS

This application is a continuation-in-part of application Ser. No. 08/436,949 filed May 8, 1995, for "Auxiliary System for a Motor Vehicle", abandoned.

BACKGROUND OF THE INVENTION

The invention relates to an auxiliary system for a motor vehicle having a drive motor, in particular, an internal combustion engine, with the auxiliary system including at least two auxiliary devices, e.g., a power-assist pump, a fan and/or an antiskid pump, and the like, and with the auxiliary devices being driven electrically and intermittently and only then when it is necessary for driving the vehicle.

Motor vehicle drives, in particular the drives of passenger motor vehicle, include an internal combustion engine which simultaneously drives auxiliary devices such as fan, power-assist pump, usually by a belt drive. As the operation of the auxiliary devices is needed only for a short time, intermittently, for performing their tasks, it was proposed to use individual electric motors for driving the auxiliary devices instead of having them driven constantly by the internal combustion engine, with the electric motors being turned on only when the operation of the respective auxiliary devices is necessary.

However, using a plurality of electric motors for driving separate auxiliary devices increases the costs of manufacturing of motor vehicles.

Accordingly, an object of the invention is to reduce the costs associated with providing a motor vehicle with auxiliary devices.

SUMMARY OF THE INVENTION

This and other objects of the invention, which will become apparent hereinafter, are achieved by providing an auxiliary system with a single electric motor for driving at least two auxiliary devices and with a free wheel arrangement for operatively connecting the two auxiliary devices with the single electric motor in such a way that at least one of the auxiliary devices is, from time to time, operatively disconnected from the electric motor.

Of course, the invention is not limited to an auxiliary system with two auxiliary devices. Rather, more than two auxiliary devices may be provided which are connected with a single electric motor. This becomes possible because providing, according to the invention, of reverse free wheels, which connect the auxiliary devices with the electric motor, permits to reliably operatively disconnect from the electric motor one or several auxiliary devices, so that they become non-operational. The disconnection of one or more auxiliary devices is effected periodically, in accordance with the driving conditions. For example, if the auxiliary devices are represented by a fan and a power-assist pump, the electric motor will be only then activated when at least one of the two auxiliary devices need be operated due to a change in the driving conditions. When it is required that both auxiliary devices operate, then either both auxiliary devices are driven simultaneously which requires a selection of an electric motor of an appropriate size, or only one of the auxiliary device, in accordance with predetermined criteria or priority, is operated at a time, i.e., the drive of the auxiliary devices is effected alternatively and intermittently.

An auxiliary system, according to one embodiment of the invention, may include a reversible electric motor and a free wheel arrangement which, upon rotation in one direction, connects an auxiliary device with the electric motor and, upon rotation in the opposite direction, disconnects the auxiliary device from the electric motor. This permits, e.g., to connect the electric motor, upon its clockwise rotation with one of the auxiliary devices, and to connect the electric motor with another of the auxiliary devices, upon rotation of the electric motor in the counter-clockwise direction. This permits to turn on one or the other of the auxiliary devices in a simple manner by just reversing the direction of rotation of the electric motor. The size of the motor is selected, in this case, in accordance with the power consumption or requirement of the auxiliary device requiring the greater power. Preferably, auxiliary devices having the same power consumption are connected with a single electric motor.

In accordance with another embodiment of the invention, the auxiliary system comprises a free wheel arrangement, which upon rotation in one direction, operatively connect auxiliary devices with the electric motor and, upon rotation in an opposite direction, does not operatively connects the auxiliary devices with the electric motor. Under an appropriate control in this way, several auxiliary devices can be driven with a single electric motor periodically one after another, with that auxiliary device being operatively connected with the electric motor, which is required in accordance with the existing driving conditions or priority.

An auxiliary system in accordance with a further embodiment of the invention is provided with an electric motor which includes two shaft stubs connected with the clockwise and counter-clockwise rotatable free wheels, respectively, and with the clockwise and counter-clockwise rotatable free wheels being connected with two auxiliary devices, respectively. Thereby, upon rotation of the electric motor in a respective direction, a respective one of the free wheels will be in its driving condition while the other of the free wheels will be in its free wheeling condition. Upon changing of the rotational direction of the electric motor, the conditions of the two free wheels will change accordingly. As a result, one or the other of the auxiliary devices will be driven, dependent on the rotational direction of the electric motor.

It is to be pointed out that the electric motor does not operate continuously but is only then turned on when required by the driving conditions, i.e., when at least one of the auxiliary devices, e.g., for cooling purposes or for pressure build-up for the antiskid system should be activated. This insures energy efficient operation of the auxiliary system and permits to reduce costs by eliminating the need in separate electric motors for separate auxiliary devices. Also, by providing a single electric motor, the weight of the auxiliary system is reduced.

According to one of the embodiments of the invention, the auxiliary system includes two free wheels, a clockwise rotatable free wheel and a counter-clockwise rotatable free wheel, connected with two auxiliary devices respectively; and an electric motor, which is a reversible electric motor, includes a shaft stub for driving the clockwise and counter-clockwise rotatable wheels.

An auxiliary system according to the present invention can also include a unidirectional rotatable electric motor having its shaft stub driving at least two free wheel arrangement, which are so operatively connected with two auxiliary devices that upon activation of the electric motor, only one of the two free wheel arrangements is drivingly connected with a respective auxiliary device. By alternatively switching the connection of the free wheel arrangements with the auxiliary devices, it is possible to activate only one of them, which is more important for maintaining optimal driving conditions, e.g., as determined by priority control means.

According to a particular preferred embodiment of the invention, the shaft stud of a unidirectional rotatable electric motor can be permanently drivingly connected with one of the auxiliary devices and, additionally, be connected, by a reverse free wheel arrangement, with another auxiliary device. With this arrangement, it is possible to operate both auxiliary devices simultaneously. For operating two auxiliary devices simultaneously, an electric motor of a size, which would insure such operation, should be used. However, because the two auxiliary devices need not both operate all the time but operate in this way only temporarily, by activation of the reverse free wheel arrangement, an optimal operation of the auxiliary system can be insured.

Advantageously, the starting motor of the vehicle drive (of the internal combustion engine) can be used as the electric motor of the auxiliary system. In this way, the starting motor, required for starting of the internal combustion engine, can be used for performing another function, namely, for driving at least one auxiliary device. This provides a very cost-effective solution because after starting the internal combustion engine, the starting motor is available for performing another function, and no need in an additional electric motor exists. In order for the starting motor to be able to drive the auxiliary devices, a conventional starting motor need to be correspondingly modified.

Advantageously, the auxiliary system according to the present invention includes a control device which, on one hand controls actuation of the electric motor and, on the other hand, provides for changing the rotational direction of the electric motor. The control device also controls switching of the direction of rotation of the free wheel arrangement (s) when required for driving respective auxiliary devices. Preferably, the control device includes a priority circuit which, according to the importance of the operation of one or another auxiliary device, determines which of the auxiliary units need be operated or, when operation of several auxiliary devices is required, the order of their actuation. Thus, e.g. when the fan operates and a pressure build-up is needed for the power-assisted system, then in order to provide for reliable driving, the cooling device is turned off and the auxiliary device, which is responsible for the assist pressure build-up, is operated. Thus, the power-assist pump has a higher priority than the fan.

Of course, the present invention is not limited to an auxiliary system including only such auxiliary devices as cooling fan, power-assist pump, anti-skid system, etc. but the system may include other auxiliary devices, which are not mentioned here.

BRIEF DESCRIPTION OF THE DRAWINGS

The objects and features of the present invention will become more apparent, and the invention itself will be best understood from the following detailed description of the preferred embodiments when read with reference to the appended claims, wherein:

DETAILED DESCRIPTION OF THE PREFERRED EMBODIMENTS

Figure 1:
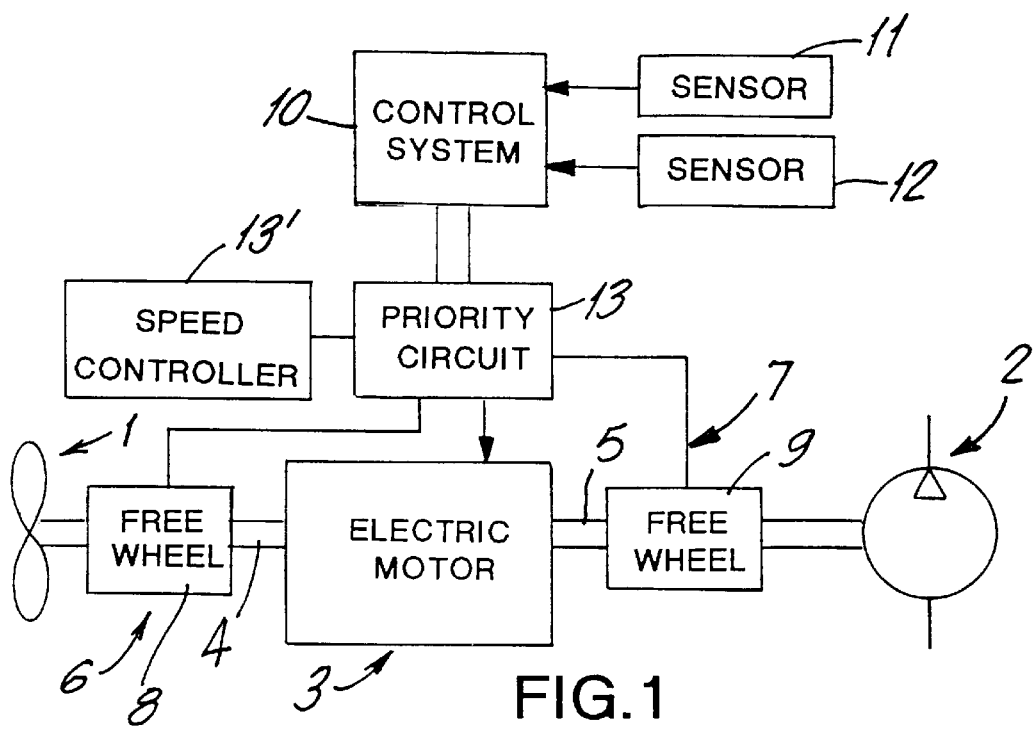
FIG. 1 is a basic block-diagram of a first embodiment of an auxiliary system according to the present invention.

FIG. 1 shows an auxiliary system for use with a motor vehicle having a drive motor, e.g., an internal combustion engine (not shown), according to the present invention. The system shown in FIG. 1 comprises two auxiliary devices 1 and 2 driven by a common electric motor 3. The first auxiliary device 1 may be, e.g., a fan for cooling the internal combustion engine, when needed. The second auxiliary device 2 may be, e.g., a power-assist pump which provides operating pressure for a power-assisted steering system. The above-mentioned auxiliary devices need not operate continuously during the operation of a motor vehicle. It was, e.g., found out that a fan needs operate only 20% of the operational time of the vehicle, and that the power-assisted steering system is required only during 10–30% of driving time.

The electric motor 3, shown in FIG. 1, has, on opposite sides thereof, two shaft stubs 4, 5, respectively. The shaft stubs 4 and 5 are connected with a free-wheel arrangement 6, 7 and includes a first, clockwise rotatable free wheel 8 and a second, counter-clockwise rotatable free wheel 9. The shaft stubs 4 and 5 are connected with the free wheels 8 and 9, respectively. The free wheel 8 is associated with the first auxiliary device 1, and the free wheel 9 is associated with a second auxiliary device 2. The electric motor 3 is associated with a control device 10 which receives control signals from two sensors 11 and 12. The control device 10 can be formed as a simple electrical device, e.g., it may be formed as a circuit breaker or the like. However, because the control device 10 is designed for a motor vehicle, it may represent a rather expensive electronic device. The sensors 11 and 12 monitor the operation of the motor vehicle, e.g., the temperature of the internal combustion engine and the condition of the power-assisted steering system. If the temperature of the internal combustion engine exceeds a predetermined value, the sensor 11 actuates the control device 10 which, in turn, turns on the electric motor 3 in a direction such that the free wheel 8 changes its free wheeling function to a driving function, so that the shaft stub 4 becomes operatively connected with the fan (first auxiliary device 1) whereby a corresponding cooling of the engine is effected. If the sensor 12 senses a requirement in additional steering power, i.e., that the power-assist pump (auxiliary device 2) need be actuated, a corresponding signal is communicated to the control device 10. The control device 10 actuates the electric motor 3 in direction opposite to the rotational direction of the electric motor 3 when it is used for driving the fan. Thereby, the free wheel 9 is actuated in a driving direction, providing for driving of the auxiliary device 2, i.e., the power-assist pump. Due to the use of oppositely rotatable free wheels 8 and 9, it is reliably insured that during the operation of one of the auxiliary devices, the other remains non-operational.

Different auxiliary devices, with regard to their operation, have different priorities, dependent on the importance of them being operated. Therefore, the control device 10 contains a priority circuit 13 that determines when and which of the two auxiliary devices 1 and 2 should be actuated first.

The sensor 11 may be formed, e.g., as a thermometer for sensing a temperature of a coolant in a coolant circuit which the auxiliary device 1, i.e., the fan, should maintain. The sensor 12 may be formed, e.g., as a pressure sensor for sensing the pressure of the fluid in the feed circuit of the power-assist steering, which pressure is to be maintained by the auxiliary device 2, i.e., power-assist pumps, or, e.g., as a steering torque sensor on the steering wheel or on the steering gear.

During operation of a vehicle, both sensors 11 and 12 generate signals representing the operational data, i.e., the temperature of the coolant in the engine coolant circuit and the fluid pressure in the feed circuit for the power-assist steering or the steering torque, and communicate these signals to the control circuit 10. The control circuit 10 actuates the electric-motor 3 in the desired direction as discussed above. The corresponding actuation of the electric motor 3 is monitored by the priority circuit 13. E.g., when both signals generated by the sensors 11 and 12 deviate from predetermined temperature and pressure values, respectively, i.e., indicating that the coolant temperature exceeds the predetermined value and that the fluid pressure in the feed circuit for power-assist steering falls below the predetermined value, the priority circuit 13 insurers actuation of the electric motor 3 in the direction corresponding to the actuation of the auxiliary device 2 in order to bring the fluid pressure to the predetermined value. At that, the high coolant temperature is not dealt with. However, as soon as the fluid pressure reaches the predetermined value, the priority circuit 13 actuates the electric motor 3 in the opposite direction corresponding to the actuation of the auxiliary device 1.

The priority circuit 13 may include a speed controller 13$^1$ which insures that the rotational speed of the electric motor 3 corresponds to the speed of the respective auxiliary device 1 or 2, when the auxiliary devices 1 and 2 have different speeds.

Figure 2:
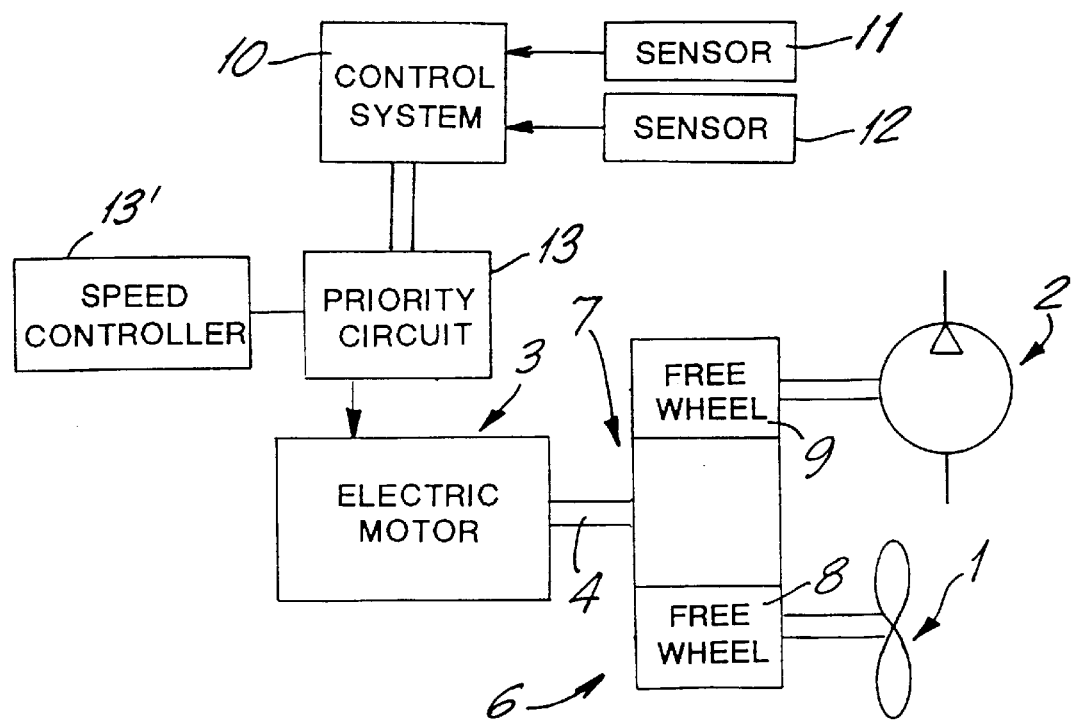
FIG. 2 is a basic block-diagram of a second embodiment of an auxiliary system according to the present invention.

FIG. 2 shows another embodiment of an auxiliary system according to the invention, which is somewhat similar to that shown in FIG. 1. However in the system of FIG. 2, there is provided only one shaft stub which insures driving of both free wheels 8 and 9, with the free wheels 8 and 9 being respectively rotatable in clockwise and counter-clockwise directions. As a result, upon the rotation of the shaft stub 4 either one free wheel, e.g., the free wheel 8, performs its driving function, with the other being in non-driving condition, or, upon the rotation of the shaft stub 4 in an opposite direction, the other free wheel 9 performs its driving function, with the one free wheel being in its non-driving condition. Thus, dependent on the direction of rotation, either the auxiliary device 1 or the auxiliary device 2 is being operational, upon the actuation of the electric motor 3. The operation of the priority circuit 13 is similar to that described with reference to FIG. 1.

Figure 3:
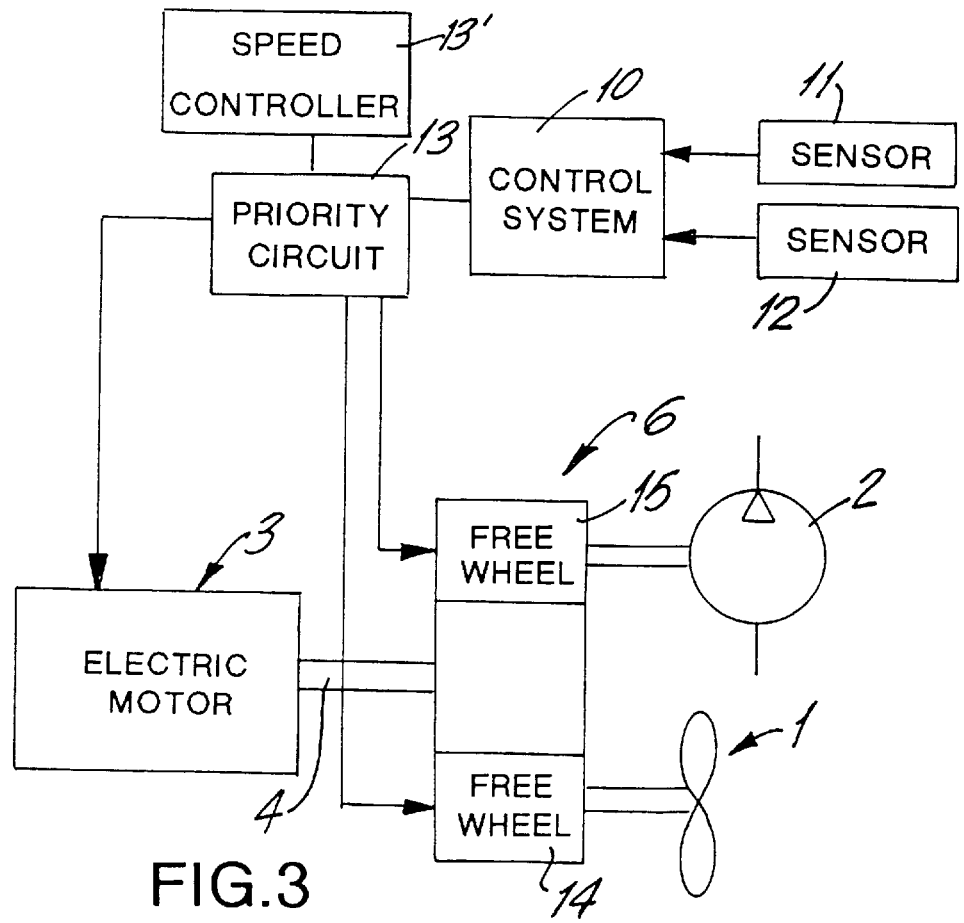
FIG. 3 is a basic block-diagram of a third embodiment of an auxiliary system according to the present invention.

FIG. 3 shows a further embodiment of an auxiliary system according to the invention. In this embodiment, the shaft stub 4 of the electric motor 3 is connected with a free wheel arrangement 6 including two reverse free wheels 14 and 15. In this embodiment, in accordance with the position of the free wheels 14 and 15, the electric motor 3 is alternatively operationally connected with the auxiliary device 1, e.g., the fan, or with the auxiliary device 2, e.g., power-assist pump. The positions of the free wheels 14 and 15 are so controlled by the control device 10 that when one of the free wheels 14 and 15 is in driving position thereof, the other of the free wheels 14 and 15 is in a non-driving position thereof. Thereby, it becomes possible to operate the auxiliary devices 1 and 2, with a single electric motor 3, alternatively and, advantageously, intermittently.

Figure 4:
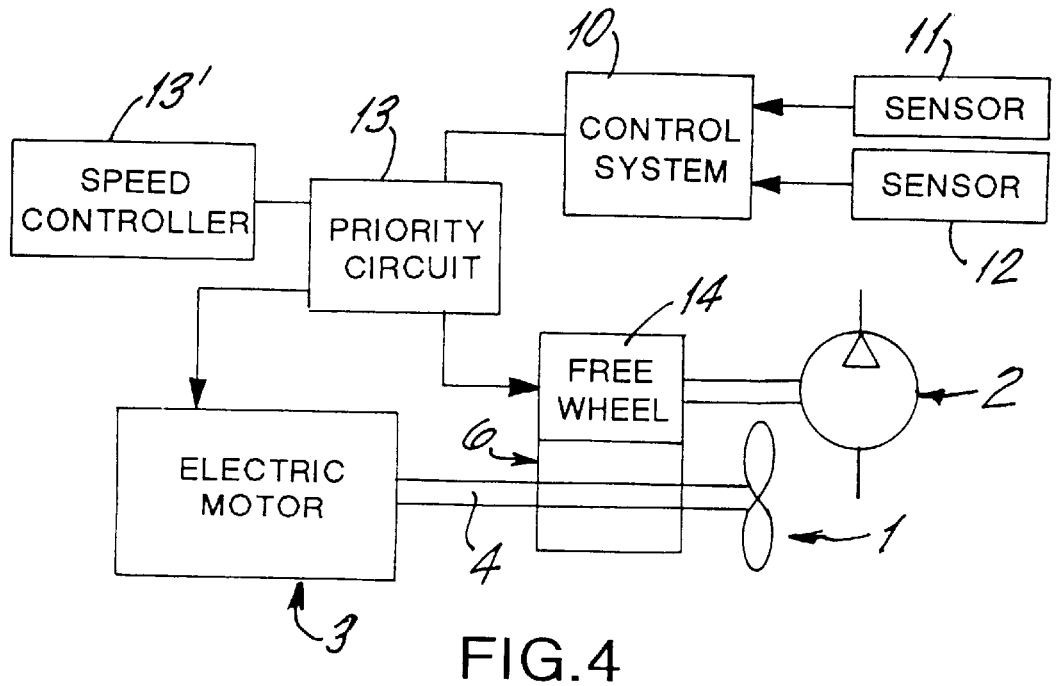
FIG. 4 is a basic block-diagram of a fourth embodiment of an auxiliary system according to the present invention.

FIG. 4 shows an embodiment of an auxiliary system according to the present invention, in which the shaft stub 4 of the electric motor 3 is constantly connected with the auxiliary device 1. In this embodiment, the free wheel arrangement 6 is so formed that simultaneously with the actuation of the auxiliary device 1, the auxiliary device 2 can be also actuated, upon communicating of an appropriate control signal from the control device 10 to the free wheel arrangement 6. In this case, the free wheel arrangement 6 provides for an operational connection of the shaft stub 4 with the auxiliary device 2, upon having received a corresponding control signal. The driving connection is obviously effected only then when it is necessary for a proper operation of a motor vehicle. In this case, the size of the electric motor is so selected that it can operate simultaneously two (or more) auxiliary devices.

Figure 5:
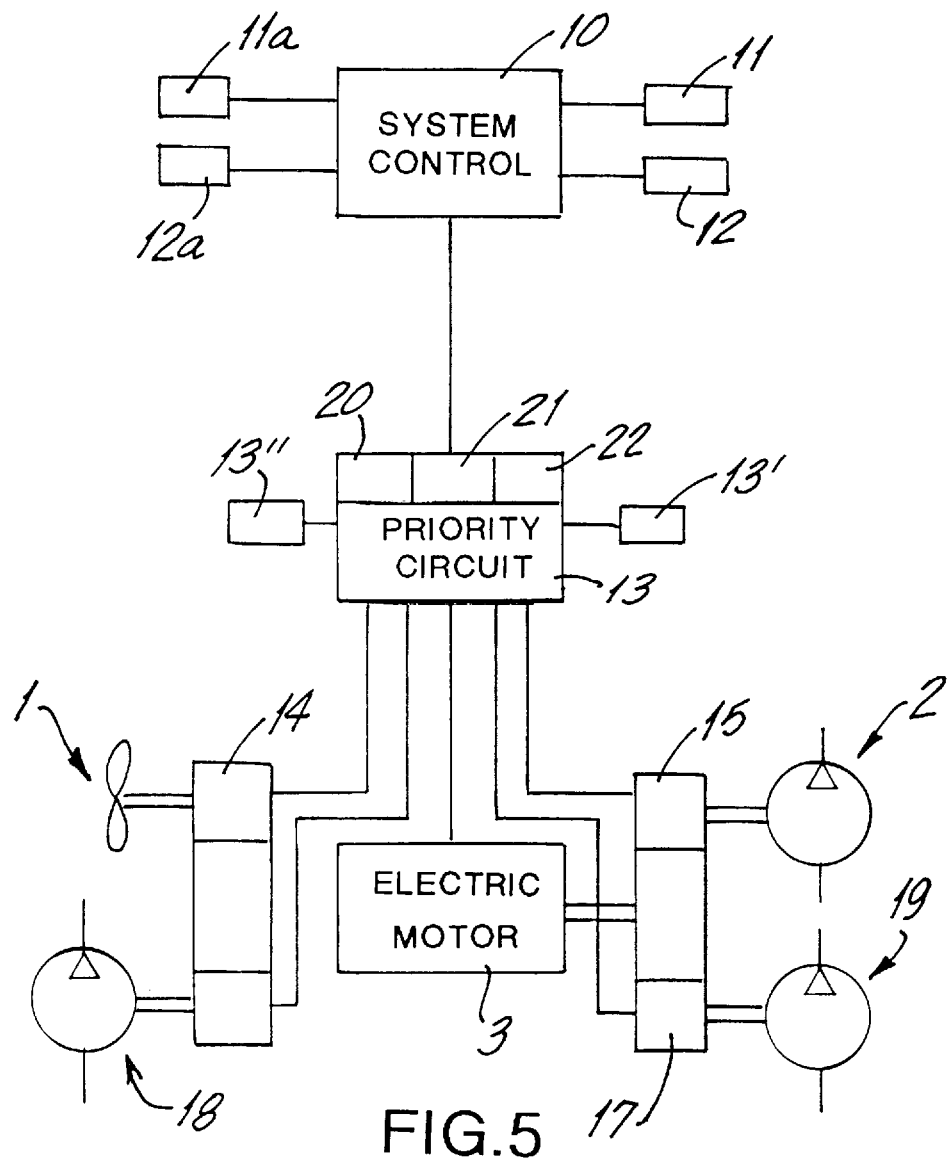
FIG. 5 is a block-diagram of a fifth embodiment of an auxiliary system according to the present invention.

FIG. 5 shows an embodiment of an auxiliary system according to the present invention in which the electric motor 3 drives four auxiliary devices, namely, 1, 2, 18 and 19. Each of the auxiliary devices 1, 2, 18 and 19 is associated with a respective free wheel 14, 15, 16 or 17. In this embodiment, the auxiliary devices 1 and 2 represent, as in the previous embodiments, an engine fan and a power-assist pump, and the devices 18 and 19 represent, respectively, e.g., a compressor of an air conditioner and a compressor for filling an air storage tank of a pneumatic brake. At that, there are provided two additional sensors 11a and 12a for sensing, respectively, coolant temperature of the air conditioner and an air pressure in the air storage tank.

The priority circuit 13 of this embodiment controls which of the auxiliary devices 1, 2, 18 and 19 should be actuated and, particularly, controls operation, including the case when actuation of at least two auxiliary devices is required. The priority circuit 13 includes as in the previous embodiments a speed controller 13' and is associated with a speed sensor 13" for sensing the speed of the motor vehicle, or a steering torque sensor 13".

The sensors 11, 12, 11a and 12a generate corresponding operational data and communicate them to the control circuit 10. The control circuit 10 generates corresponding control signals and communicate them to the priority circuit 13 which controls which of the auxiliary device or devices 1, 2, 18 and 19 is (are) actuated first. The priority has that of the auxiliary devices 1, 2, 13 and 19 which is most necessary for a reliable operation of the motor vehicle. In the embodiment shown in FIG. 5, the first priority has the auxiliary device 19 which insures a reliable operation of the braking system of the vehicle. The second priority has the power-assist pump, the auxiliary device 2. The auxiliary devices 1 and 18 have lower priorities, with the auxiliary device 18 having the lowest priority. The order of priorities is either programmed into the priority circuit, and/or the priority circuit is correspondingly configurated, i.e., advantageously at least one logic (boolean) switching element or gate 22 is provided. The vehicle speed data, which are communicated by the sensor 13" are used to evaluate whether the actuation of the auxiliary device 2, the power-assist pumps, need be effected. This is to avoid the actuation of the power-assist pump and, thereby, of the power-assist steering at high speeds. As known, the power-assist steering is used at low speeds, because it is not necessary to provide steering assist at high speed, because at high speeds, only a small steering force should be applied by the driver. At high speeds of a motor vehicle, the order of priority of actuation of auxiliary devices 1, 2, 18 and 19 is changed, with, e.g., the auxiliary device 1 having a higher priority than the auxiliary device 2. The priority circuit 13, may include at least one electronic memory 20 and an arithmetic logic unit 21 for processing the algorithm which is stored in the memory 20. The memory 20 can be formed, e.g., as a programmable read only memory (PROM).

The priority circuit of the auxiliary system according to FIG. 5 not only determines the priority of actuation of different auxiliary devices according to a predetermined pattern but is capable of changing the pattern in accordance with operational parameters of the vehicle, e.g., speed.

Figure 6:
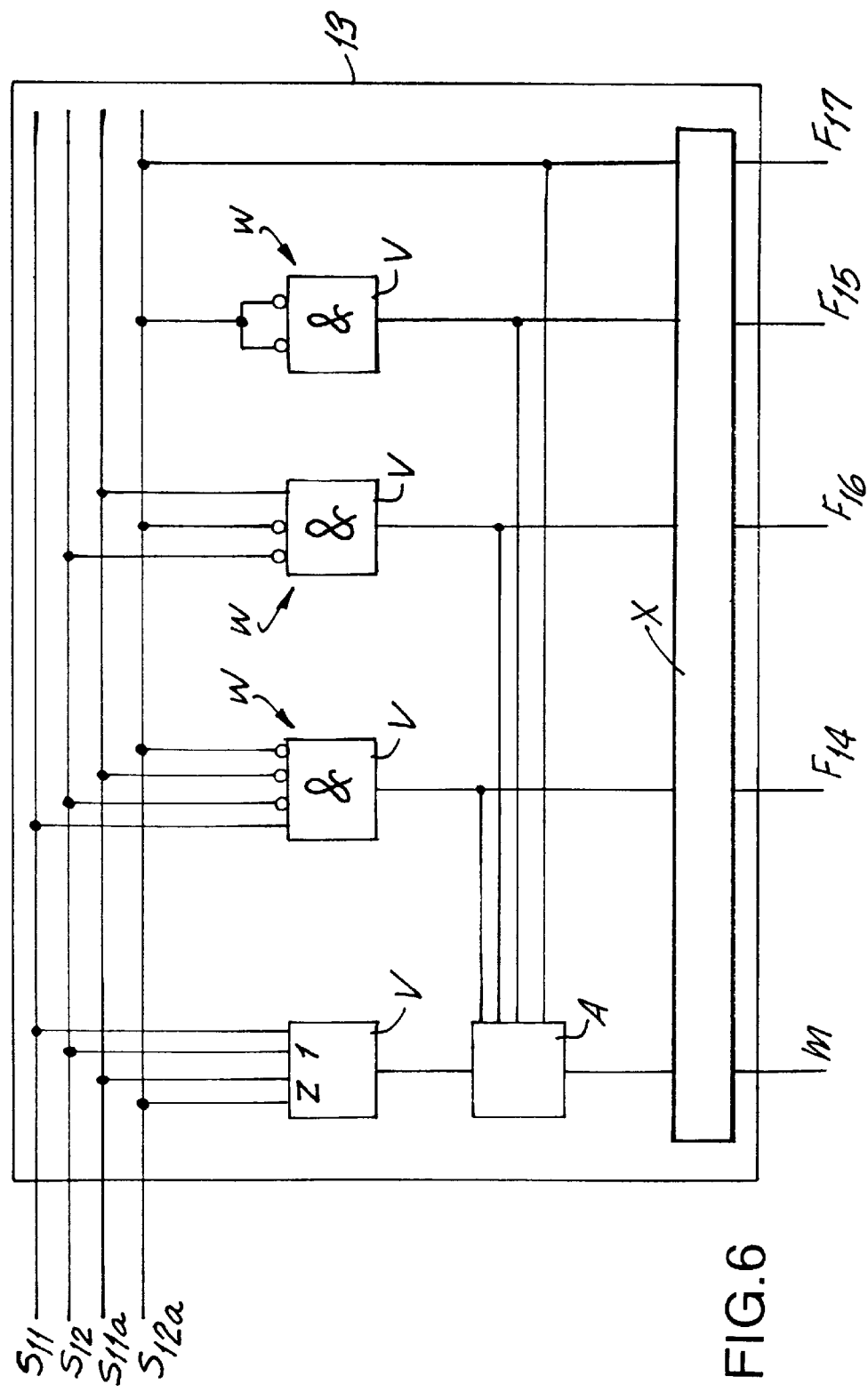
FIG. 6 is a schematic diagram showing a first embodiment of a priority circuit forming part of the auxiliary system according to the present invention.

Now the operation of the priority circuit 13 will be described with reference to FIGS. 6–7. FIG. 6 shows a simplified schematic view of the priority circuit 13, which correspond to the priority circuit of FIG. 5. The priority circuit 13, which is shown in FIG. 6, has four inputs $S_{11}$, $S_{12}$, $S_{11a}$ and $S_{12a}$ and five outputs M, $F_{14}$, $F_{15}$, $F_{16}$, and $F_{17}$. The inputs $S_{11}$, $S_{12}$, $S_{11a}$ and $S_{12a}$ receive control signals emitted by the control circuit 10 (not shown in FIG. 6). The control signals are generated in response to the comparison of actual signals communicated by sensors 11, 12, 11a and 12a with respective set values stored in the control circuit 10. If one, several or all of the actual values deviate from the set values in respective directions, corresponding control signals are communicated to the priority circuit 13 for effecting operation of respective auxiliary devices. The order of actuation of the auxiliary devices 1, 2, 18 and 19 in accordance with the received control signals is shown in the truth table, table 1. The motor actuation signal is communicated to the electric motor 3 from the output M, with the respective free wheels 14, 15, 16, 17 being actuated by signals emitted via outputs $F_{14}$, $F_{15}$, $F_{16}$, and $F_{17}$.

TABLE 1

| $S_{11}$ | $S_{12}$ | $S_{11a}$ | $S_{12b}$ | M | $F_{14}$ | $F_{15}$ | $F_{16}$ | $F_{17}$ |
|---|---|---|---|---|---|---|---|---|
| 0 | 0 | 0 | 0 | 0 | 0 | 0 | 0 | 0 |
| 1 | 0 | 0 | 0 | 1 | 1 | 0 | 0 | 0 |
| 0 | 1 | 0 | 0 | 1 | 0 | 1 | 0 | 0 |
| 1 | 1 | 0 | 0 | 1 | 0 | 1 | 0 | 0 |
| 0 | 0 | 1 | 0 | 1 | 0 | 0 | 1 | 0 |
| 1 | 0 | 1 | 0 | 1 | 0 | 0 | 1 | 0 |
| 0 | 1 | 1 | 0 | 1 | 0 | 1 | 0 | 0 |
| 1 | 1 | 1 | 0 | 1 | 0 | 1 | 0 | 0 |
| 0 | 0 | 0 | 1 | 1 | 0 | 0 | 0 | 1 |
| 1 | 0 | 0 | 1 | 1 | 0 | 0 | 0 | 1 |
| 0 | 1 | 0 | 1 | 1 | 0 | 0 | 0 | 1 |
| 1 | 1 | 0 | 1 | 1 | 0 | 0 | 0 | 1 |
| 0 | 0 | 1 | 1 | 1 | 0 | 0 | 0 | 1 |
| 1 | 0 | 1 | 1 | 1 | 0 | 0 | 0 | 1 |
| 0 | 1 | 1 | 1 | 1 | 0 | 0 | 0 | 1 |
| 1 | 1 | 1 | 1 | 1 | 0 | 0 | 0 | 1 |

The priority circuit 13 includes a plurality of logic elements or gates formed as OR-gates, having their inputs communicating with respective inputs $S_{11}$, $S_{12}$, $S_{11a}$ and $S_{12a}$ of the priority circuit 13. The priority circuit 13 further includes three AND-gates W. The OR-gates V process information communicated to the inputs $S_{11}$, $S_{12}$, $S_{11a}$ and $S_{12a}$.

The output M is actuated as soon as at least one of the inputs $S_{11}$, $S_{12}$, $S_{11a}$ and $S_{12a}$ is actuated. This results in the actuation of the electric motor 3. The logic algebraic equation for the output M is as follows:

$$M = S_{11} + S_{12} + S_{11a} + S_{12a}.$$

This means that the electric motor is actuated when the input $S_{11}$ or the input $S_{12}$ or the input $S_{11a}$, or the input $S_{12a}$ has a logic "1".

The logic algebraic equation for the output $F_{14}$ is as follows:

$$F_{14} = S_{11} * \overline{S_{12}} * \overline{S_{11a}} * \overline{S_{12}}$$

This means that the output $F_{14}$ is actuated when the input $S_{11}$ has a logic "1", with the remaining inputs $S_{12}$, $S_{11a}$ and $S_{12a}$ having a logic "0".

The input $F_{15}$, and thus the free wheel 15, is actuated when the input 12a has a logic "0". The logic algebraic equation for the output $F_{15}$ is $$F_{15} = \overline{S_{12a}}$$

The input $F_{16}$ is actuated when the following equation is satisfied:

$$F_{16} = S_{11a} * \overline{S_{12}} * \overline{S_{12a}}$$

This means that the output $F_{16}$ is then actuated when the input $S_{11}$ has a logic "1" and the inputs $S_{12}$ and $S_{12a}$ have a logic "0".

For the input $F_{17}$, the logic algebraic equation is $$F_{17} = S_{12a}$$

This means that the input $F_{17}$ is actuated when the input $S_{12a}$ has a logic "1".

In addition, an evaluation circuit A is associated with the priority circuit 13. The evaluation circuit A has a plurality of inputs connected to the outputs of the logic gate V. The evaluation circuit performs the following functions:

When the output M, i.e., the electric motor 3 need to be actuated, it is then necessary to actuate an appropriate auxiliary device 1, 2, 18 or 19.

The evaluation circuit A indicates which of the outputs $F_{14}$, $F_{15}$, $F_{16}$, $F_{18}$ is to be actuated before the output M is actuated. It is contemplated that an actuation signal emitted by the output M can be varied, dependent on which of the outputs $F_{14}$, $F_{15}$, $F_{16}$ and $F_{17}$ is actuated. This means that the rotational speed of the electric motor 3 can be, e.g., smaller with actuation of the input $F_{14}$ than with actuation of the input $F_{17}$. The rotational speed of the electric motor 3 is always adapted to the speed of the auxiliary device 1, 2, 18 or 19 to be actuated.

The priority circuit further includes an amplifying circuit X for amplifying signals generated by logic gates V and/or evaluation circuit A so that the electric motor M and the free wheels 14, 15, 16, 17 are always supplied with the desired voltage and/or current intensity.

It is contemplated that only one auxiliary device 1, 2, 18, 19 is actuated at a time in order not to overload the electric motor 3. When as a result of signals generated by sensors 12, 12, 11a, 12a, two auxiliary devices need to be actuated, the priority circuit indicates which of the devices need to be actuated first.

Figure 7:
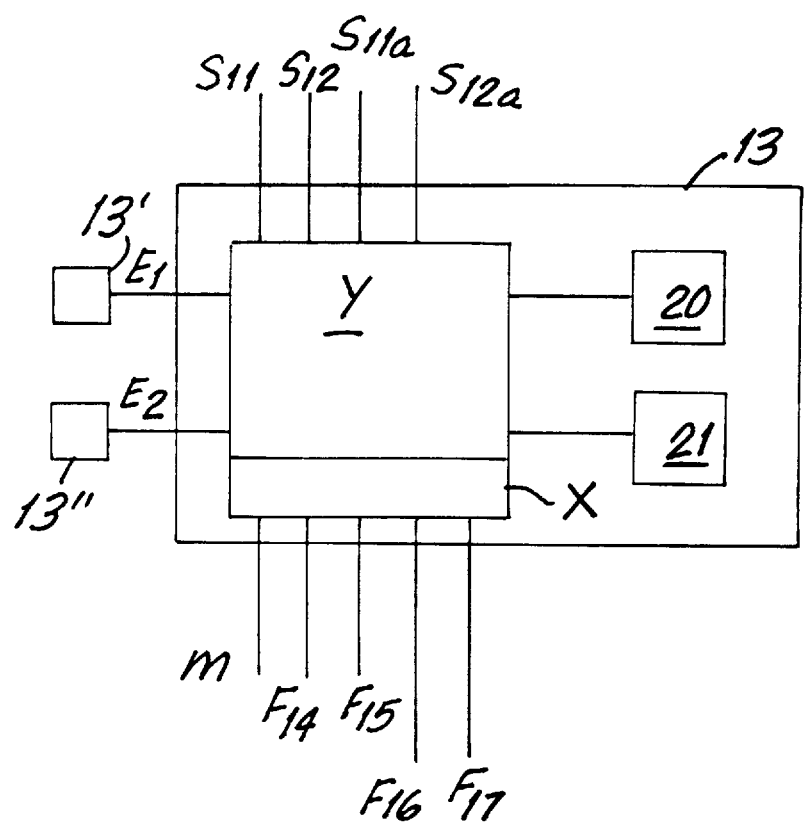
FIG. 7 is a schematic diagram showing a second embodiment of a priority circuit forming part of the auxiliary system according to the present invention.

FIG. 7 shows another embodiment of a priority circuit 13 corresponding to the priority circuit 13 used in the auxiliary system shown in FIG. 5. As in the embodiment of FIG. 6, the priority circuit 13, shown in FIG. 7, has four inputs $S_{11}$, $S_{12}$, $S_{11a}$ and $S_{12a}$ and five outputs M, $F_{14}$, $F_{15}$, $F_{16}$ and $F_{17}$. The priority circuit 13 of FIG. 7 has two additional inputs E, and $E_2$ connected, respectively, with the speed controller 13' and the speed sensor 13". The priority circuit 13 further comprises the memory 20 and the arithmetic logic unit 21, the amplifying circuit X and a processor Y.

The priority circuit of FIG. 7 functions as follows. The control signals in accordance with the signals generated by sensors 11, 12, 11a and 12a. The information carried by the control signals is processed, together with information received at the inputs $E_1$ and $E_2$, in the processor Y. The processing algorithm is stored in the memory 20 and is processed in the logic arithmetic unit 21. The priority actuation of the auxiliary devices 1, 2, 18 and 19 is effected in accordance with the algorithm which controls actuation of the outputs M and $F_{14}$, $F_{15}$, $F_{16}$ and $F_{17}$, taking in the account information supplied by the speed sensor 13". As discussed previously, the priority order is changeable in accordance with the speed of the vehicle. In the embodiment of the priority circuit 13 shown in FIG. 17, the software (algorithm) performs the same function as the hardware (logic gates V and the evaluation circuit A) in the embodiment of the priority circuit 13 shown in FIG. 6.

The priority circuit of FIG. 7 permits to control operation of the auxiliary devices 1, 2, 18 and 19 not only in accordance with a predetermined pattern, but is also capable of changing the predetermined pattern in accordance with operational parameters of a motor vehicle. This permits to adopt the priority pattern to different operational conditions of the motor vehicle.

Because, according to the invention, the electric motor 3 can be connected not only with one but rather with a plurality of auxiliary devices, which need be operated selectively or together, it is possible to reduce the weight, its mounting space and costs. In order to be able to operate separate auxiliary devices simultaneously or alternatively, it is only necessary to provide a control device 10 which, on one hand, turns the electric motor 3 on and off and, on the other hand, determines which auxiliary device should be in its operational or non-operational condition. In this way, driving of several auxiliary devices with a single motor becomes possible.

Preferably, the auxiliary devices, which are associated with the electric motor, should have the same power consumption, e.g., 400 W for the power-assist pump and 400 W for the fan. The oppositely rotatable free wheels 8 and 9 insure respective opposite rotations of the power-assist pump and the fan. The control signals, which are generated by the sensors 11 and 12, correspondingly indicate whether the electric motor 3 should rotate in a direction in which power-assisted steering or cooling is effected. The priority circuit insures that first that auxiliary unit is actuated which is more important for a reliable driving of a motor vehicle. By using appropriate free wheels 8 and 9, e.g., by using switchable free wheels, it is also possible to determine, dependent on the switching position thereof, which of the auxiliary devices is driven by the electric motor 3, and which is not.

As it has already been noted above, when the electric motor is required to drive several auxiliary devices simultaneously, e.g., two auxiliary devices, of which one is constantly connected with the electric motor and the other is connected only intermittently, with each auxiliary device having a power consumption of 400 W, the electric motor should be so selected that its power output is a sum of power consumption of the two auxiliary devices, i.e., an 800 W electric motor should be used.

Though the present invention was shown and described with reference to the preferred embodiments, various modifications thereof will be apparent to those skilled in the art and, therefore, it is not intended that the invention be limited to the disclosed embodiments and details thereof, an departure may be made therefrom within the spirit and scope of the present invention as defined in the appended claims.

What is claimed is:

1. An auxiliary system for use in a motor vehicle having a drive motor, said auxiliary system comprising:

at least two intermittently driven auxiliary devices;

a single electric motor for driving the at least two auxiliary devices;

free wheel means for operatively connecting the at least two auxiliary devices with the electric motor in such a way that at least one of the at least two auxiliary devices from time to time, is not operatively connected with the electric motor; and control means comprising a priority circuit which determines, in accordance with importance, which one of the at least two auxiliary devices should be actuated first if simultaneous actuation of both auxiliary devices is required, wherein the priority circuit comprises a speed controller for operating the electric motor with a rotational speed corresponding to a speed of the actuated auxiliary device.

2. An auxiliary system as set forth in claim 1, wherein the electric motor is a reversible electric motor, and the free wheel means comprises a free wheel which, upon rotation in one direction, operatively connects the one of the at least two auxiliary devices with the electric motor and, upon rotation in an opposite direction, does not operatively connect the one of the at least two auxiliary devices with the electric motor.

3. An auxiliary system as set forth in claim 1, wherein the free wheel means comprises a reverse free wheel which, upon rotation in one direction, operatively connects the one of the at least two auxiliary devices with the electric motor and, upon rotation in an opposite direction, does not operatively connect the one of the at least two auxiliary devices with the electric motor.

4. An auxiliary system as set forth in claim 1, wherein the electric motor includes two shaft stubs provided on opposite sides thereof, wherein the free wheel means comprises a clockwise rotatable free wheel and a counter-clockwise rotatable free wheel, said two shaft-stubs being connected with said clockwise and counter-clockwise rotatable free wheels, respectively, and wherein said clockwise and counter-clockwise rotatable free wheels are connected with said at least two auxiliary devices, respectively.

5. An auxiliary system as set forth in claim 1, wherein said free wheel means comprises a clockwise rotatable free wheel and a counter-clockwise rotatable free wheel connected with said at least two auxiliary devices, respectively, and said electric motor includes a shaft stub for driving said clockwise and counter clockwise rotatable wheels.

6. An auxiliary system as set forth in claim 1, wherein said free wheel means comprises two reverse free wheels connected with said at least two auxiliary devices, respectively, and wherein said electric motor comprises a shaft stub connected with said two reverse free wheels so that, upon rotation in one direction, one of said reverse free wheels is operatively connected with a respective one of the at least two auxiliary devices while another of said reverse free wheels is not operatively connected with another one of the at least two auxiliary devices and, upon rotation in opposite direction, the another one of said reverse free wheel is operatively connected with the another one of said at least two auxiliary devices while the one of said two reverse free wheel is not operatively connected with said respective one of said at least two auxiliary devices.

7. An auxiliary system as set forth in claim 1, wherein said electric motor includes one shaft stub constantly operatively connected with one of said at least two auxiliary devices, and wherein said free wheel means comprises at least one reverse free wheel operatively connected with another of said at least two auxiliary devices.

8. An auxiliary system as set forth in claim 1, wherein said electric motor is formed as a starting motor of the motor vehicle.

9. An auxiliary system as set forth in claim 1, wherein the priority circuit comprises a speed controller for operating the electric motor with a rotational speed corresponding to a speed of the actuated auxiliary device.

10. An auxiliary system as set forth in claim 9, wherein the priority circuit comprises logic means for processing the control signals received from the control circuit, and means for outputting actuation signals to the auxiliary devices.

11. An auxiliary system as set forth in claim 10, wherein the priority circuit comprises at least two inputs communicating with respective outputs of the control circuit, and the outputting means comprises at least two outputs associated with respective auxiliary devices, and a third output connected with the electric motor for actuating the same in response to a control signal being communicated to at least one of the inputs of the priority circuit.

12. An auxiliary system as set forth in claim 10, wherein the priority circuit comprises processor means for processing the control signals received from the control circuit in accordance with a predetermined algorithm and for outputting actuation signals to the auxiliary devices.

13. An auxiliary system as set forth in claim 12, wherein the processing means comprises a memory for storing the algorithm.

14. An auxiliary system as set forth in claim 12, wherein the priority circuit further comprises at least one sensor for sensing an operational parameter of the motor vehicle, which is not controlled by any of the auxiliary devices, and the processing means comprises means for changing a priority of actuation of the auxiliary devices set by the algorithm in accordance with information received from the at least one sensor.

15. An auxiliary system as set forth in claim 14, wherein the at least one sensor is formed as one of a speed sensor for sensing speed of the motor vehicle and a steering torque sensor for sensing the torque on the steering wheel of the motor vehicle.

16. An auxiliary system for use in a motor vehicle having a drive motor, said auxiliary system comprising:

at least two intermittently driven auxiliary devices;

a single electric motor for driving the at least two auxiliary devices;

free wheel means for operatively connecting the at least two auxiliary devices with the electric motor in such a way that at least one of the at least two auxiliary devices from time to time, is not operatively connected with the electric motor; and control means comprising a priority circuit which determines, in accordance with importance, which one of the at least two auxiliary devices should be actuated first if simultaneous actuation of both auxiliary devices is required, wherein the control means comprises at least two sensors for sensing operational parameters of the motor vehicle, which are used to control the at least two auxiliary devices, and a control circuit for generating control signals in accordance with information received from the at least two sensors and for communicating the control signals to the priority circuit.

* * * * *